(12) United States Patent
Strawczynski

(10) Patent No.: US 6,522,633 B1
(45) Date of Patent: Feb. 18, 2003

(54) CONFERENCING ARRANGEMENT FOR USE WITH WIRELESS TERMINALS

(75) Inventor: Leo Strawczynski, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/218,429

(22) Filed: Dec. 22, 1998

(51) Int. Cl.⁷ .............................. H04L 12/16; H04M 3/42
(52) U.S. Cl. .................. 370/260; 379/202.01; 379/158; 455/416
(58) Field of Search .............................. 370/260–267; 455/416–417; 379/201, 202.01, 157–159

(56) References Cited

U.S. PATENT DOCUMENTS

| | | | | |
|---|---|---|---|---|
| 5,436,896 A | * | 7/1995 | Anderson et al. | 370/260 |
| 5,768,263 A | * | 6/1998 | Tischler et al. | 370/263 |
| 5,848,098 A | * | 12/1998 | Cheng et al. | 455/416 |
| 6,078,809 A | * | 6/2000 | Proctor | 455/416 |

* cited by examiner

*Primary Examiner*—Steven Nguyen
(74) *Attorney, Agent, or Firm*—Jean-Pierre Fortin

(57) ABSTRACT

This invention provides a conferencing arrangement for use with two or more wireless terminals. According to the invention, the conferencing arrangement receives signals from a plurality of input communication paths of which at least two are from wireless terminals. In one embodiment of the invention, the wireless terminals will receive either a low bit rate (LBR) signal which has undergone conversion from a pulse code modulated (PCM) signal, or an LBR signal forwarded from an input terminal without any conversion. Advantageously, the ability to forward an original LBR signal from a wireless terminal to one or more output terminals reduces unnecessary tandem encoding. In another embodiment, only LBR signals required for conference summing are decoded and encoded, thereby resulting in hardware savings.

16 Claims, 6 Drawing Sheets

CONFERENCING ARRANGEMENT FOR USE WITH WIRELESS TERMINALS

FIELD OF THE INVENTION

This invention relates to a technique for conferencing arrangements and, in particular, to a technique for a conferencing arrangement for use with two or more wireless terminals.

BACKGROUND OF THE INVENTION

Conferencing is the ability to couple information signals among three or more users in a communication system. The conferencing arrangement may involve voice or non-voice signals, including data, video, and facsimile signals.

In the case of audio teleconferencing, there may be one or more wireless users involved in the communication. Typically, in digital wireless systems speech is transmitted over the air interface as packets or frames. Accordingly, the incoming speech at a subscriber terminal is collected, organized into frames and low bit rate encoded. The speech is then transcoded to pulse code modulated speech (PCM) before entering the mobile switching center (MSC). Then generally, in the case where a voice conferencing bridge is involved, the signal power of the conferees is measured, compared, and each conferee receives a weighted sum of perhaps the two loudest talkers other than him/herself. For conference calls involving two or more wireless participants, the signals received by the wireless terminals will be transcoded to linear PCM, a weighted sum will be taken and then reencoding will take place, even when only a single participant in the conference is speaking. Such a tandem-encoded signal will demonstrate degraded quality of voice.

There was an attempt made in the prior art by D. Nahumi in U.S. Pat. No. 5,390,177 to improve the voice quality in a conference bridge. In the Nahumi patent, the conferencing bridging technique is for use with compressed information signals only. The technique involves first measuring the signal energy transmitted by each conferee. When there is only one conferee speaking, the summing circuit and the speech decoding/coding apparatus is bypassed, and the talking conferee's signal is broadcast to all conferees. When there is more than one conferee speaking at a given time, then only the speaking conferees' signals are routed to an associated speech decoder wherein those conferees' compressed signals are decompressed. The summing circuit then combines these decompressed signals and the sum is recompressed and broadcast to all conferees. The invention disclosed in the Nahumi patent does not have the capability to provide more than one output signal, as the conference bridge has only a single speech encoder in the output direction. Thus, the same compressed signal is broadcast to all users.

There exists therefore a need for a telephone conferencing arrangement in the situation where there are two or more wireless users, and there may or may not be PSTN users whose signals may or may not be compressed, which would provide clearer communication than that associated with prior conferencing arrangements and in which there is the capability to provide more than one output signal. There is a need for a system in which the conference bridge would result in superior signal addition and performance.

SUMMARY OF THE INVENTION

An object of the present invention is to provide an improved telephone conferencing arrangement for use with two or more wireless terminals, and any or no PSTN terminals.

In accordance with an aspect of the present invention, there is provided a conferencing apparatus comprising means for receiving signals at a conference bridge from a plurality of input communication paths of which at least two are associated with low bit rate voice signals, means for estimating the signal energy in each of said input communication paths to give a signal energy estimation, means for comparing each of said signal energy estimations against a predetermined threshold, and means responsive to said signal energy estimating and comparing means for forwarding the low bit rate voice signal from one of said input communication paths to a second output communication path also associated with an incoming low bit rate voice signal, when said signal energy estimation provides a first result.

In accordance with another aspect of the present invention, there is provided a conferencing apparatus comprising means for receiving signals at a conference bridge from a plurality of input communication paths of which at least two are associated with low bit rate voice signals, means for estimating the signal energy in each of said input communication paths to give a signal energy estimation, means for comparing each of said signal energy estimations against a predetermined threshold, and means responsive to said signal energy estimating and comparing means for forwarding the low bit rate voice signal from one of said input communication paths to one or more output communication paths, each associated with an incoming low bit rate voice signal, if the signal energy estimation of only said one of said input communication paths is above said predetermined threshold.

In accordance with a further aspect of the present invention, there is provided a conferencing apparatus comprising means for receiving signals at a conference bridge from a plurality of input communication paths of which at least two are associated with low bit rate voice signals, means for estimating the signal energy in each of said input communication paths to give a signal energy estimation, means for comparing each of said signal energy estimations against a predetermined threshold, and means responsive to said signal energy estimating and comparing means for forwarding a first low bit rate voce signal and a second low bit rate voice signal from each of two input communication paths to output communication paths associated with said two input communication paths, wherein said first low bit rate voice signal is forwarded to the output communication path associated with the second low bit rate voice signal and vice versa, when said signal energy estimating and comparing means provides a second result.

In a still further aspect of the invention, there is provided a conferencing apparatus comprising means for receiving signals at a conference bridge from a plurality of input communication paths of which at least two are associated with low bit rate voice signals, means for estimating the signal energy in each of said input communication paths to give a signal energy estimation, means for comparing each of said signal energy estimations against a predetermined threshold, and means responsive to said signal energy estimating and comparing means for decoding only each of said low bit rate voice signals that is required by said conferencing apparatus.

In a yet further aspect of the invention, there is provided a method of providing a conference communication comprising the steps of receiving signals at a conference bridge from a plurality of input communication paths of which at least two are associated with low bit rate voice signals, estimating the signal energy in each of said input communication paths to obtain a signal energy estimation, comparing each of said signal energy estimations against a predetermined threshold to obtain a signal energy comparison, and in response to said signal energy estimations and comparisons, forwarding the low bit rate voice signal from one of said input communication paths to a second output communication path also associated with an incoming low bit rate voice signal, when said signal energy estimation provides a first result.

In another aspect of the invention, there is provided a method of providing a conference communication comprising the steps of receiving signals at a conference bridge from a plurality of input communication paths of which at least two are associated with low bit rate voice signals, estimating the signal energy in each of said input communication paths to obtain a signal energy estimation, comparing each of said signal energy estimations against a predetermined threshold to obtain a signal energy comparison, and in response to said signal energy estimations and comparisons, forwarding the low bit rate voice signal from one of said input communication paths to one or more output communication paths, each associated with an incoming low bit rate voice signal, if the signal energy estimation of only said one of said input communication paths is above said predetermined threshold.

In a still further aspect of the invention, there is provided a method of providing a conference communication comprising the steps of receiving signals at a conference bridge from a plurality of input communication paths of which at least two are associated with low bit rate voice signals, estimating the signal energy in each of said input communication paths to obtain a signal energy estimation, comparing each of said signal energy estimations against a predetermined threshold to obtain a signal energy comparison, and in response to said signal energy estimations and comparisons, forwarding a first low bit rate voce signal and a second low bit rate voice signal from each of two input communication paths to output communication paths associated with said two input communication paths, wherein said first low bit rate voice signal is forwarded to the output communication path associated with the second low bit rate voice signal and vice versa, when said signal energy estimation and comparison provides a second result.

In a yet further aspect of the invention, there is provided a method of providing a conference communication comprising the steps of receiving signals at a conference bridge from a plurality of input communication paths of which at least two are associated with low bit rate voice signals, estimating the signal energy in each of said input communication paths to obtain a signal energy estimation, comparing each of said signal energy estimations against a predetermined threshold to obtain a signal energy comparison, and in response to said signal energy estimations and comparisons, decoding only each of said low bit rate voice signals that is required for said conference communication.

Similar references are used in different figures to denote similar components.

DETAILED DESCRIPTION OF THE PREFERRED EMBODIMENT

In order to lighten the following description, the following acronyms will be used:

DEMUX: Demultiplexer

LBR: Low Bit Rate

MSC: Mobile Switching Center

MUX: Multiplexer

PCM: Pulse Code Modulation

PSTN: Public Switching Telephone Network

RF: Radio Frequency.

Typically in wireless systems, speech is transmitted over the air interface as packets or frames. The incoming speech at a subscriber terminal is collected, organized into frames and LBR encoded. The speech is transcoded into PCM before entering the MSC.

Figure 1:
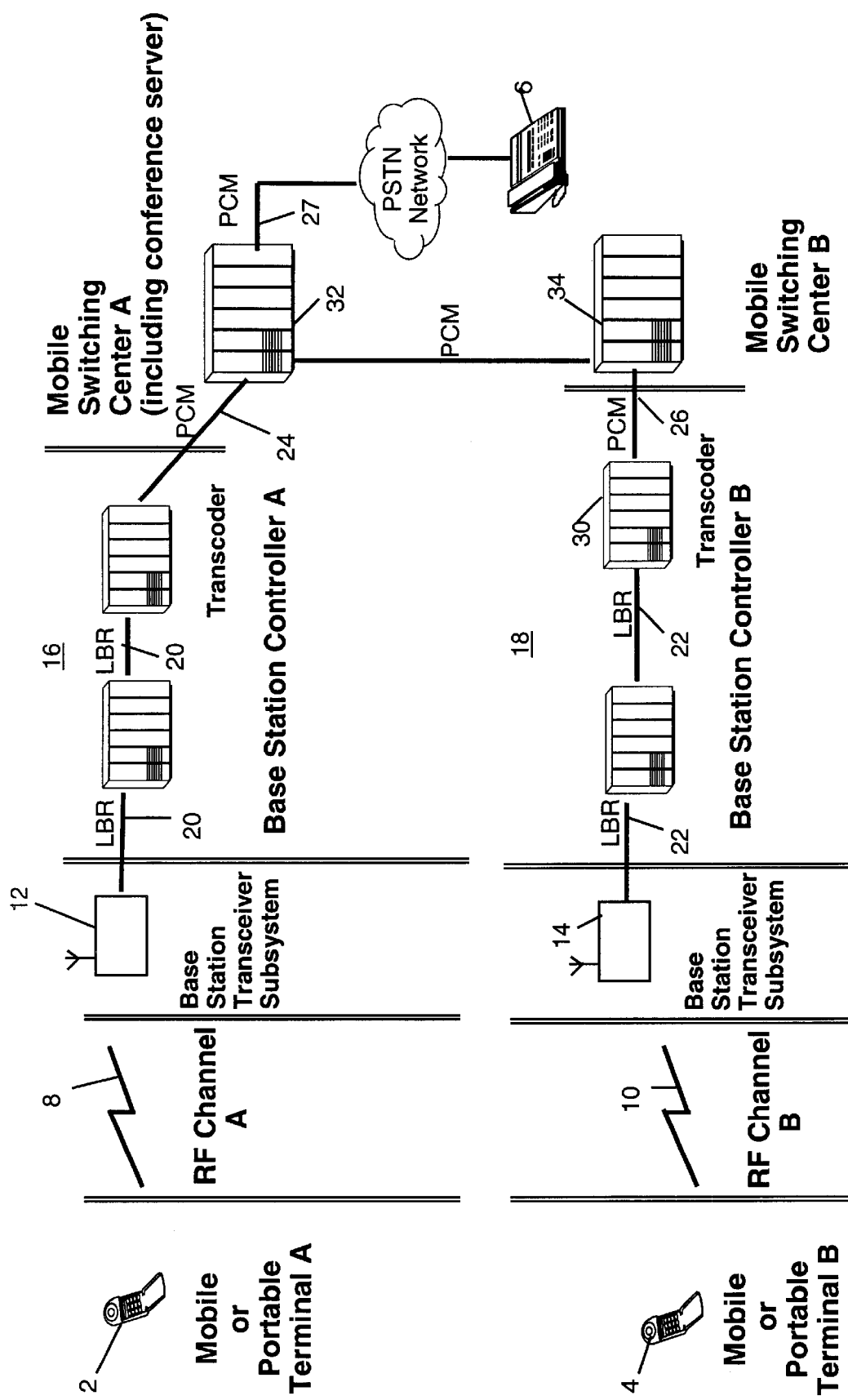
FIG. 1 is an illustrative block diagram of the steps involved in a conventional conference call involving two mobile users.

Referring to FIG. 1, there is illustrated the signal flow for a conventional three party conference call. In this example, two of the participants are using mobile or portable terminals 2, 4 and the third participant is using a PSTN terminal 6. The mobile users communicate via RF channels 8, 10 to base stations, each of which is comprised of a base station transceiver 12, 14 and a base station controller 16, 18. The signals 20, 22 represent LBR encoded speech and the signals 24, 26 represent companded PCM, the result of signals 20, 22 having passed through the respective transcoders 28, 30. Companded PCM signals 24, 26 are then forwarded to the respective MSCs 32, 34. The speech from the PSTN terminal 6 enters the MSC 32 as PCM signal 27.

Then, typically in a voice conferencing bridge the signal power from the participants is measured and compared and each participant receives a weighted sum of the 2 loudest talkers other than him/herself. For conference calls involving two or more wireless participants, as is the case described in FIG. 1, the signals received by the wireless terminals are tandem encoded. This means that for the signals that were transcoded to linear PCM as outlined above, a weighted sum is taken, and then there will be reencoding. This tandem encoding will occur even when there is only a single participant in the conference call who is speaking. Unfortunately, tandem encoding results in degradation in the quality of the voice.

Figure 2:
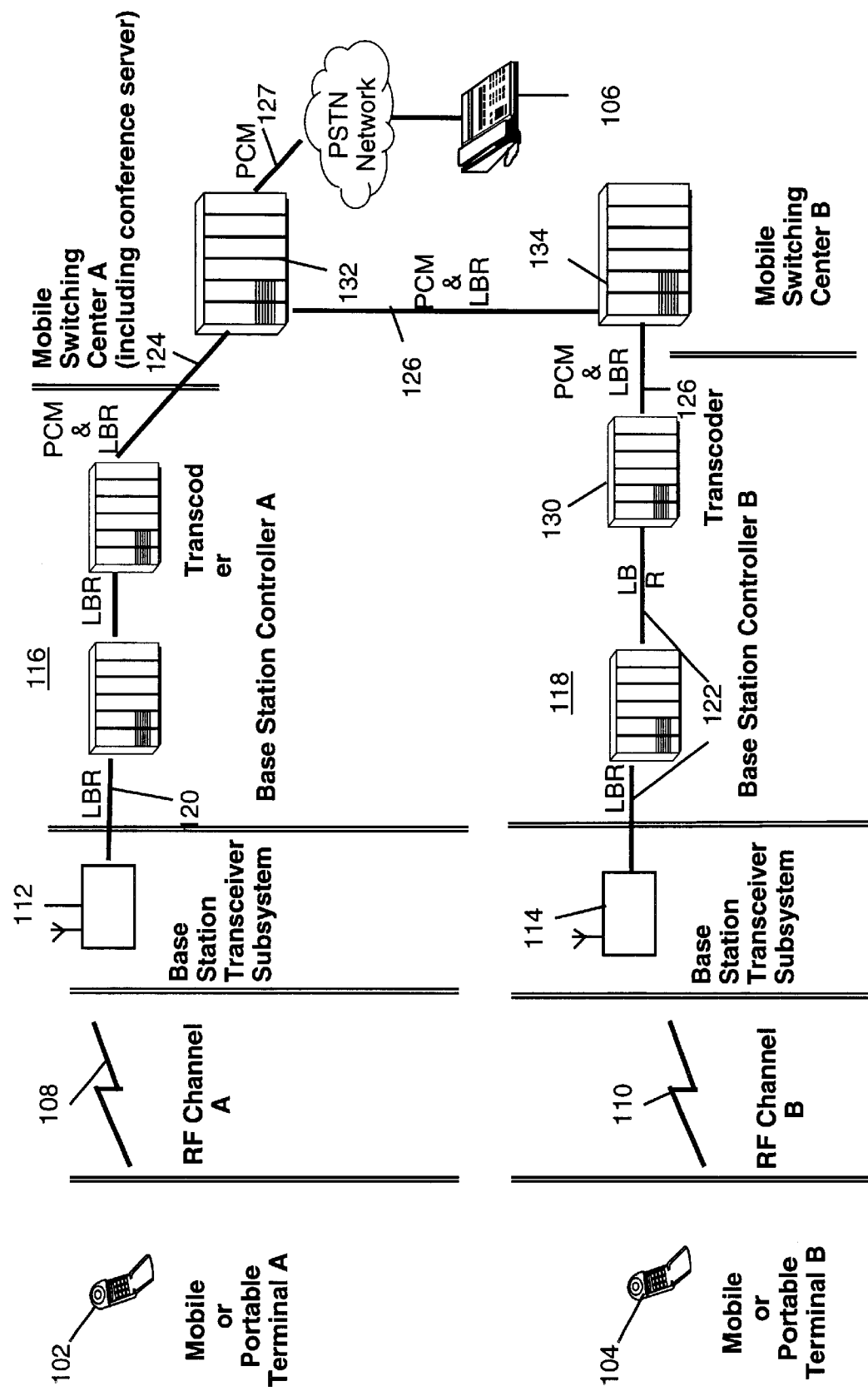
FIG. 2 is an illustrative block diagram of the steps involved in an improved conference call involving two mobile users according to a first embodiment of the present invention.

Referring now to FIG. 2, there is shown an improved conference arrangement. As was the case in the scenario illustrated in FIG. 1, two of the participants are using mobile or portable terminals 102, 104 and the third participant is using a PSTN terminal 106. The mobile users communicate via RF channels 108, 110 to base stations, each of which is comprised of a base station transceiver 112, 114 and a base station controller 116, 118. The transcoders 128, 130 within base station controllers 116, 118 convert the LBR speech 120, 122 to PCM, as was the case in the description of the prior art above. In this case, however, in contrast to the prior art, the PCM and the LBR speech frames are both delivered to the respective MSC 132, 134 in the form of a composite signal 124, 126. The speech from the PSTN terminal 106 enters the MSC 132 as PCM signal 127.

Figure 3:
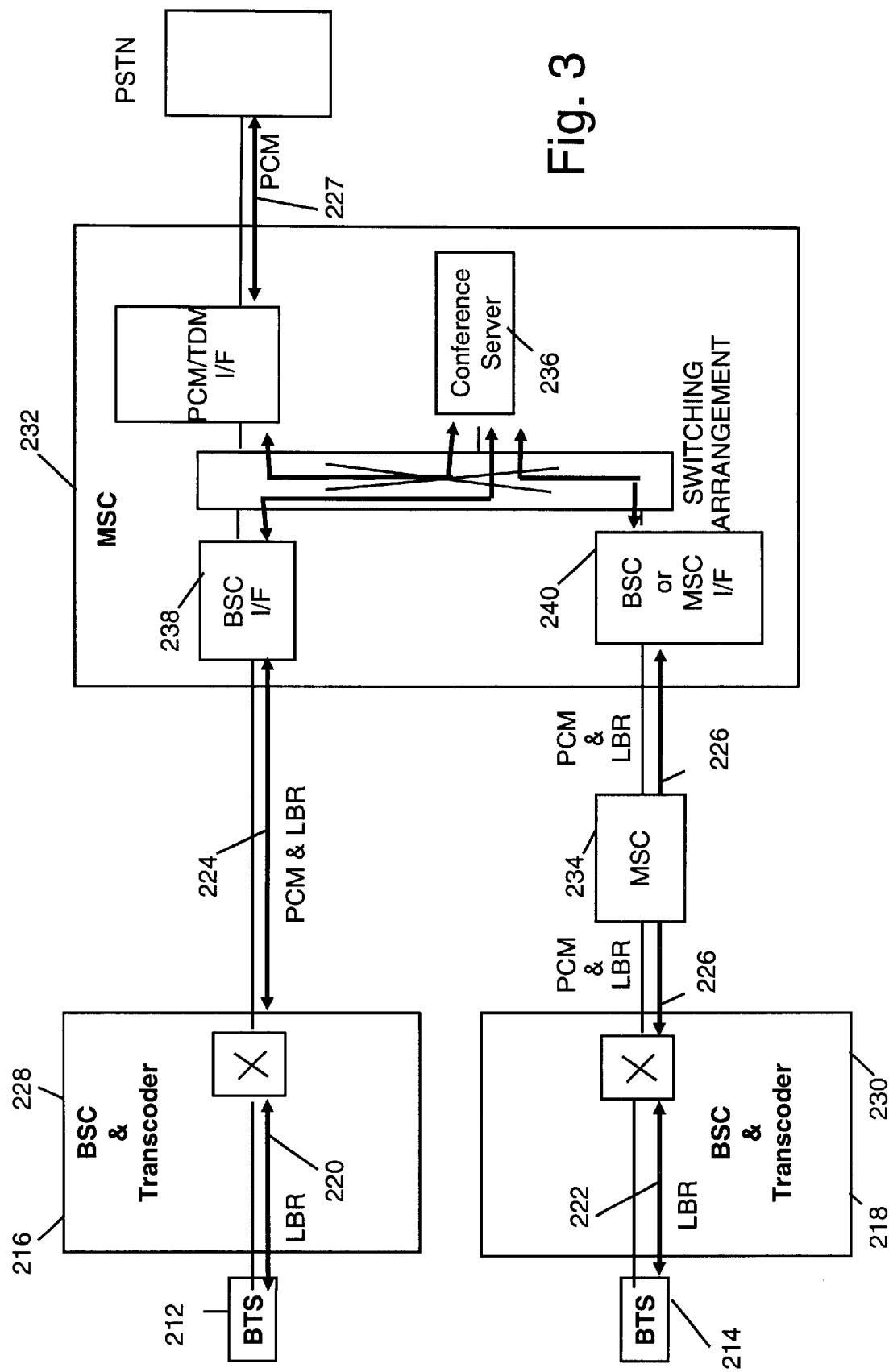
FIG. 3 is a block diagram providing an overview of the mobile switching center in FIG. 2.

FIG. 3 shows a more detailed view of the signals received by the base station transceivers 212, 214 as they are transferred to the MSCs 232, 234. Each of the base station transceivers 212, 214 forwards the LBR signal 220, 222 to the base station controller 216, 218, including the respective transcoder 228, 230. As was discussed with respect to FIG. 2, the transcoders 228, 230 convert the LBR speech to PCM, and then send a composite multiplexed signal 224, 226 to the MSCs 232, 234. In this case, MSC 234 is simply serving as a pipeline through which signal 226 must pass before reaching MSC 232 in which the conference server 236 is located. The PCM and the LBR speech which comprise composite signals 224, 226, are received via the base station controller interface or mobile switching center interface 238, 240 at MSC 232. Each composite signal 224, 226, along with the PCM signal 227 from the PSTN, is then routed to conference server 236, more clearly described below with reference to FIG. 4.

The internal switching arrangement of a MSC could be based on circuit switching, packet switching or hybrid arrangements, and a composite signal can be transported in a number of different formats depending on the internal switching arrangement of the MSC. Some examples of internal switching arrangements include Time Division Multiplexing (TDM), Frame Relay and Asynchronous Transfer Mode (ATM).

Figure 4:
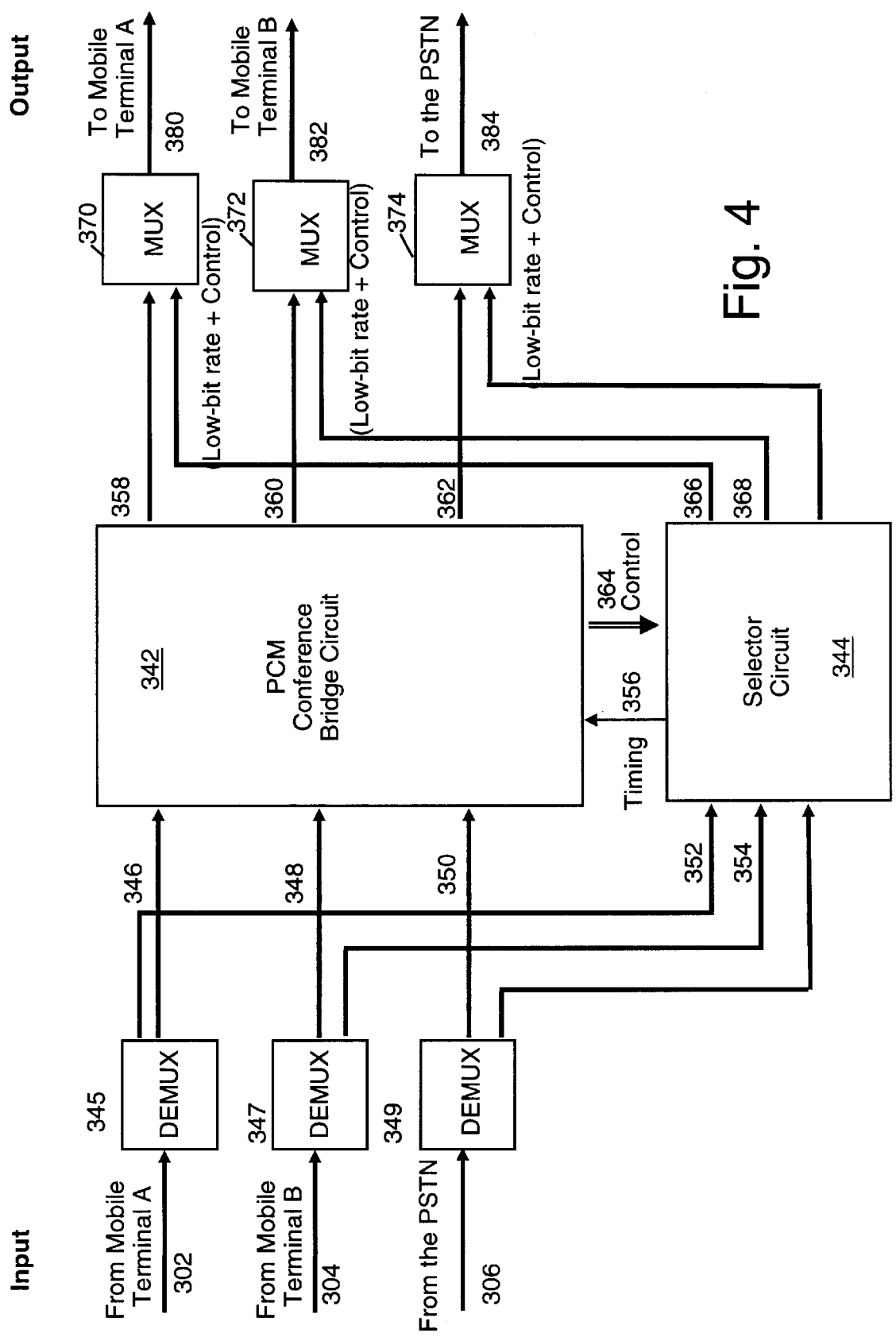
FIG. 4 is a block diagram providing an overview of the conference server in FIG. 3.

FIG. 4 provides a more detailed representation of the conference server. Again FIG. 4 is directed to the scenario involving a three port bridge, but is extendable to where there are greater than three ports. The conference server is generally comprised of a PCM conference bridge circuit 342 and a selector circuit 344, as well as a plurality of DEMUXs 345, 347, 349 and MUXs 370, 372, 374. Each input to the conference server, originating from conference participants 302, 304, 306, first passes through a DEMUX 345, 347, 349 in order to separate the incoming signal into PCM speech frames and LBR speech frames. Then, the PCM speech frames 346, 348, 350 are routed to PCM conference bridge circuit 342 and the LBR speech frames 352, 354 are routed to selector circuit 344. There are no LBR speech frames from the PSTN terminal 306 as is indicated by the broken connection from DEMUX 349 to selector circuit 344.

In selector circuit 344, LBR speech frames 352, 354 are aligned in time. Timing information 356 is sent to PCM conference bridge circuit 342, which circuit can be of a conventional design with decisions on the output signals 358, 360, 362 synchronized with the speech frame boundaries.

In PCM conference bridge circuit 342, a control signal 364 is generated and sent to selector circuit 344. It is this control signal 364 which contains information about the identity of the dominant speaker(s), if any, whose LBR signal(s), if available, should be forwarded to the output MUX connected to the appropriate mobile terminal(s) with a control signal indicating that the LBR signal is valid and is to be forwarded to the terminal. The LBR signal and the control signal together forwarded by selector circuit 344 are indicated by reference 366, 368. Specific scenarios illustrating when an LBR signal is the valid signal will be detailed below. The PCM conference bridge circuit 342 also outputs the appropriate PCM signal 358, 360, 362 to each output MUX 370, 372, 374. Again, exactly what the appropriate PCM signal is will be illustrated in the examples detailed below.

Each of the output MUXs 370, 372 multiplexes the PCM and the LBR speech- frames that it receives and forwards these signals together with an indication of which signal is valid on output 380, 382. This output 380, 382 is forwarded to the transcoder of the base station controller of the appropriate mobile terminal 302, 304. The transcoder encodes the PCM. If the LBR signal is valid, the LBR signal is forwarded to the mobile terminal, whereas if the PCM signal is valid, then the output of the transcoder is sent to the mobile terminal. Output MUX 374, however, receives only PCM signal 362, which it forwards as output 384 to the PSTN user 306.

With respect to the above description, it should be noted that for bandwidth savings, it is not necessary to send both the PCM and the LBR signals on the output paths 380, 382. Only the valid signal could be forwarded at that point.

The following scenarios further illustrate the above details.

In the situation where there is only a single dominant mobile speaker 302, transcoding of the speech to PCM is not required for the recipient mobile participant 304. Control signal 364 will contain the information on the identity of the dominant speaker, namely mobile terminal 302. In response, selector circuit 344 will send signal 368, which includes the LBR speech frames 352, from mobile terminal 302, as well as a control indicating that the LBR signal is valid and is to be forwarded to mobile terminal 304.

In the situation where there is only a single PSTN speaker 306, since the speech is not LBR based, the issue of forwarding an LBR signal does not arise.

Turning to the scenario where there is more than one speaker at a particular time, if one of the speakers is from PSTN terminal 306, then transcoding of a mobile participant's speech to linear PCM, taking a weighted sum and reencoding is required. This represents a tandem coding with its attendant degradation. This will, however, be partially masked by the mixing of the voices of more than one speaker.

Now if there are two simultaneous speakers and both are mobile users 302, 304, then the situation is somewhat different. Selector circuit 344 would indicate that the LBR speech frames from mobile terminal 302 are the valid output for mobile terminal 304 and that the LBR speech frames from mobile terminal 304 are the valid output for mobile terminal 302. Each of these would be a much clearer signal as compared to a signal that resulted from steps involving conversion to PCM. The PSTN terminal 306, however, receives a PCM signal 384, which results from a combination of, and is likely a weighted sum of, the PCM signals 358, 360 of the two mobile users 302, 304. It should also be noted that where users of mobile terminals 302, 304 are simultaneously talking, if terminal 306 were also a mobile terminal but silent, as opposed to a PSTN terminal, the selector circuit 344 would forward a control indicating that the PCM signal is the valid output, and accordingly it should be forwarded to the transcoder and the terminal 306.

The above discussion assumes a standard conferencing arrangement in which a participant hears the two loudest speakers other than the participant him/herself. It can be seen from the above description that with the present invention, conference calls involving two or more wireless participants will achieve a higher quality of sound in a number of circumstances. The conferencing arrangement is suitable whether there are or are not PSTN users involved. Further, there is the ability to provide more than one output signal.

The invention described herein for the situation in which there are two mobile users simultaneously speaking is equally applicable where there are more than two speakers speaking simultaneously, whether mobile or PSTN users, but where the conferencing arrangement must select only the two loudest, or "dominant", speakers (as opposed to the two loudest speakers other the listener him/herself) for the purposes of the conference call and those are mobile terminals.

In another embodiment of the invention, as will be described below, in addition to the advantages described above, there is the opportunity for significant hardware savings in the way of limiting the number of decoders and encoders necessary.

Figure 5:
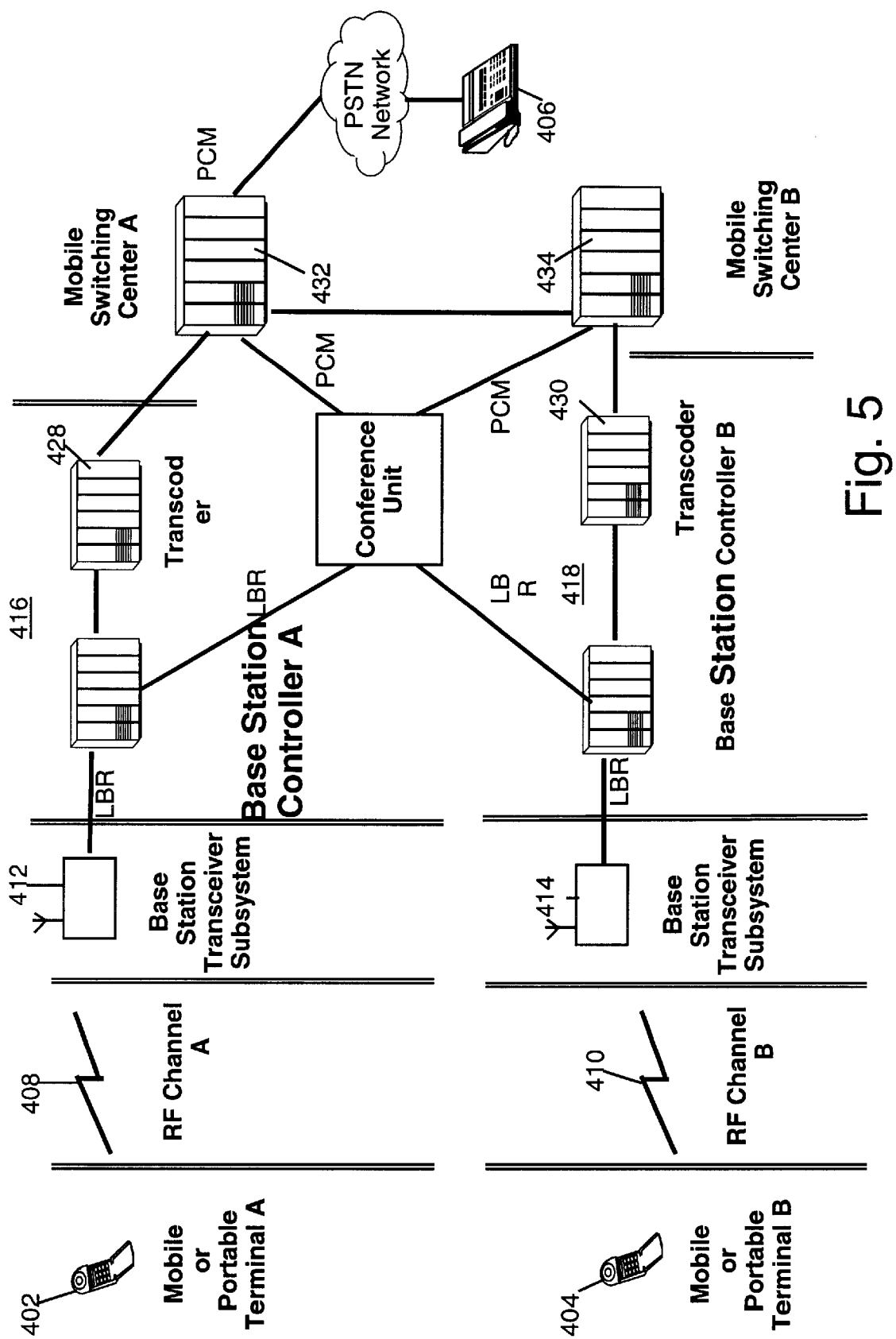
FIG. 5 is an illustrative block diagram of the steps involved in a conference call according to a second embodiment of the present invention.

Referring to FIG. 5, there is shown a general arrangement of the second embodiment. Again, two of the participants are using mobile or portable terminals 402, 404 and the third participant is using a PSTN terminal 406. The mobile users communicate via RF channels 408, 410 to base stations, each of which is comprised of a base station transceiver 412, 414 and a base station controller 416, 418. It can be seen that the main difference between this embodiment and the one described previously is that the conference unit 436 is located external to both MSCs 432, 434. Further the transcoding function is no longer automatically taking place within the base station controller for all mobile speakers, and thus the transcoders 428, 430 within base station controllers 416, 418 may or may not exist. Instead the decoding and encoding are performed by the conference unit 436 as in indicated by the LBR signals between the base station controllers 416, 418 and the conference unit 436, and the PCM signals between the conference unit and the MSCs 432, 434 (with more details to be illustrated in FIG. 6). Furthermore, decoding is only performed when needed, and only for particular conference participant(s), also to be outlined in more detail with reference to FIG. 6.

It should be noted that if bandwidth savings are a concern, then the transcoders 428, 430 within base station controllers 416, 418 could be utilized to convert the PCM signals from the PSTN to LBR before sending them to the conference unit 436. It should also be noted that although transcoders are logically located within base station controllers, typically they are co-located with the MSCs.

Figure 6:
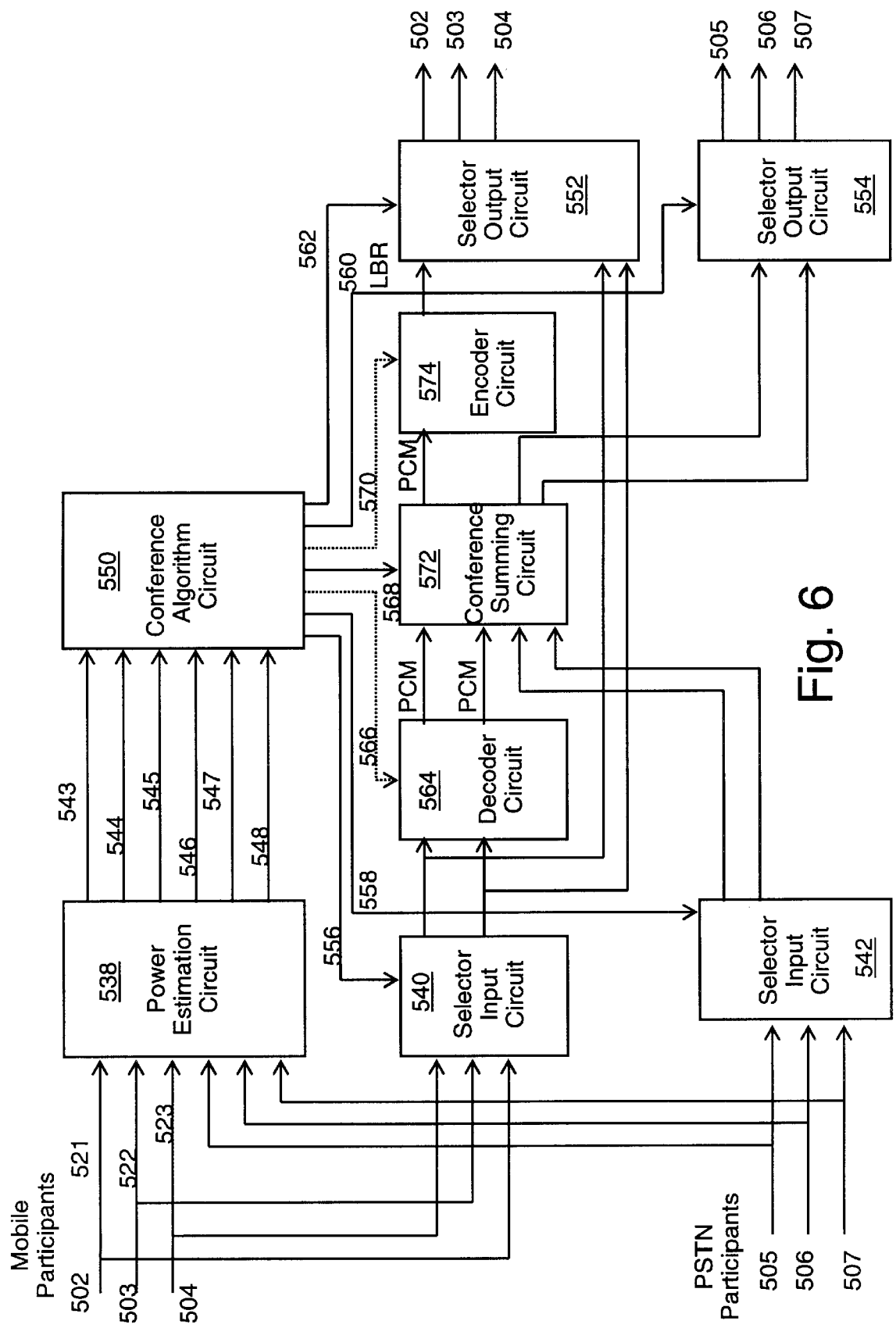
FIG. 6 is a block diagram providing a detailed overview of a conference unit according to the second embodiment.

FIG. 6 provides a detailed overview of a conference unit according to the second embodiment. The flow of the speech signals from mobile conference participants 502, 503, 504 as well as from PSTN participants 505, 506, 507 are illustrated. The LBR speech 521, 522, 523 from mobile participants 502, 503, 504 is forwarded both to a power estimation circuit 538 as well as to a selector input circuit 540 for mobile users. The PCM speech 524, 525, 526 of the PSTN participants 505, 506, 507 is forwarded both to the power estimation circuit 538 as well as to a selector input circuit 542 for PSTN users. In the power estimation circuit 538, the power or signal energy of each participant's speech is determined from either the LBR frames in the case of mobile users or the PCM frames in the case of PSTN users. Then the signal energy values 543, 544, 545, 546, 547, 548 of the speech signals are forwarded to the conference algorithm circuit 550. In the conference algorithm circuit 550, it is decided which speakers are the dominant speakers, according to its particular conference algorithm, and this information will be forwarded to the relevant selector input circuits 540, 542 in the form of control signals 556, 558. There are also control signals 560, 562, 568 which are forwarded to the selector output circuits 552, 554 and the conference summing circuit 572 respectively which will be discussed in further detail below.

In accordance with control signal 556, selector input circuit 540 will then forward any dominant mobile speakers' LBR speech frames to the decoder circuit 564 as well as to the selector output circuit 552. Decoding of the LBR speech will take place in the decoder circuit 564 unless conference algorithm circuit 550 has forwarded a control signal 566 to the decoder indicating that there is a single dominant speaker and that conversion to PCM is not necessary as there are no PSTN users, or that there are no dominant speakers art all. This control line is optional and is indicated by a dotted line in FIG. 6. Similarly there is optional control line 570 to encoder 574.

Next, the output of the decoder circuit 564, namely the PCM speech, is forwarded to the conference summing circuit 572. In accordance with control signal 558, selector input circuit 542 forwards any dominant PSTN speakers' PCM frames directly to the conference summing circuit 572. The conference summing circuit 572 then performs the summing function as per the particular conference arrangement's specifications and instructions from the conference algorithm circuit 550 via control line 568. Control line 568 may also be used to indicate that summing is not necessary at all to inhibit the function of the conference summing circuit 572 to save processing. Certain PCM signals are then sent from the conference summing circuit 572 to the encoder circuit 574 for encoding, while certain PCM signals are sent to selector output circuit 554.

At each selector output circuit 552, 554, it should be noted that there is control line 560, 562 from the conference algorithm circuit 550. Each control line indicates which output goes to which participant. Finally, the selector output circuits 552, 554 forward to the conference participants 502, 503, 504, 505, 506, 507 the appropriate outputs 581, 582, 583, 584, 585, 586.

It should be noted that the embodiment of FIG. 6 could be modified to omit any direct forwarding of LBR speech frames to the selector output circuit 552. While this means that the ability to forward an incoming LBR signal to an output path without any conversion at all is lost, the potential hardware savings, as will be now discussed in detail, still exist.

For the common conferencing arrangement in which the two loudest speakers other than the participant him/herself is considered, the potential hardware savings is great. For this arrangement, a maximum of three decoders and three encoders are required. The three decoders are required for the three speakers that could be considered by the conferencing arrangement, and the three encoders are required for the three potential outputs, namely the loudest two speakers for all participants except for the two loudest speakers themselves, the second and third loudest speakers for the loudest speaker, and the first and third loudest speakers for the second loudest speaker. For a conferencing arrangement in which more than the two dominant speakers other than oneself are considered, n speakers for example, then accordingly (n+1) decoders and (n+1) encoders are necessary.

Now considering the conferencing arrangement in which two loudest speakers are considered for the purposes of the conference call, there is even greater hardware savings. A maximum of two decoders and three encoders are required. The two decoders are needed for the maximum two speakers that will be considered by the conferencing arrangement, and the three encoders are needed for the maximum number of potential outputs, namely the loudest speaker alone, the second loudest speaker alone, and the two loudest speakers together. For a conferencing arrangement in which n dominant speakers are considered, then accordingly (n) decoders and (n+1) encoders are necessary.

Variations of the embodiment described with reference to FIG. 6 are also possible. For example, there could be only one selector input circuit and only one selector output circuit, for both the mobile terminals and the PSTN terminals to share with a multiplexing ability.

In the embodiments described herein, each time reference is made to either a single dominant speaker or multiple dominant speakers, it is assumed that each speaker has a voice energy that is above a minimum threshold energy of the conferencing arrangement, which threshold represents the energy in the voice of a typical person.

Also, in the embodiments described herein, the speech of the mobile speakers has been LBR encoded and it is assumed that the output port uses the same transcoder algorithms. In the event that different algorithms are being used, conversion between formats can be performed. An example of this type of conversion is described in applicant's co-pending U.S. patent application, Ser. No. 08/883,353, now U.S. Pat. No. 5,795,923 which is incorporated herein by reference.

With respect to the issue of echo control, currently there are two network control arrangements used in wireless systems. In one arrangement, the echo control is colocated with the transcoder on the "wireless side" of the MSC. For the arrangement described in this specification, this type of echo control function should be disabled for conference calls. That is because a conference bridge presents a time varying channel to the echo canceler and performance could be compromised. Accordingly the conference bridge should provide echo control on all ports connected to the PSTN. In the second type of network control arrangement, however, the network echo control function is provided on the interface from the MSC to the PSTN. This is the preferred arrangement. In this arrangement, network error control is not required of the conference service.

Further, the arrangements described herein are for illustrative purposes only. Other arrangements are possible to achieve the desired functionality. Such a system is not limited to just mobile or wireless users, but can be equally applicable to other LBR based systems, including a corporate network utilizing LBR voice or Voice over Internet Protocol (VoIP).

What is claimed is:

1. A conferencing apparatus comprising:
   means for receiving signals at a conference bridge from a plurality of input communication paths of which at least two are associated with low bit rate voice signals;
   means for estimating the signal energy in each of said input communication paths to give a signal energy estimation;
   means for comparing each of said signal energy estimations against a predetermined threshold; and
   means responsive to said signal energy estimating and comparing means for decoding only each of said low bit rate voice signals that is required by said conferencing apparatus, wherein said low bit rate voice signals required by said conferencing apparatus is a maximum of (n+1) for a conferencing apparatus in which a transmission on an output communication path utilizes only n signals with the greatest estimations of signal energy other than the signal energy of an input signal associated with said output communication path.

2. The apparatus as described in claim 1 wherein the number of decoders required for said decoding means is a maximum of (n+1).

3. The apparatus as described in claim 1 further comprising means for encoding each unique output for output communication paths associated with said at least two received low bit rate voice signals.

4. The apparatus as described in claim 3, wherein the number of encoders required for said encoding means is a maximum of (n+1).

5. A conferencing apparatus comprising:
   means for receiving signals at a conference bridge from a plurality of input communication paths of which at least two are associated with low bit rate voice signals;
   means for estimating the signal energy in each of said input communication paths to give a signal energy estimation;
   means for comparing each of said signal energy estimations against a predetermined threshold; and
   means responsive to said signal energy estimating and comparing means for decoding only each of said low bit rate voice signals that is required by said conferencing apparatus, wherein the number of said low bit rate voice signals required for said conferencing apparatus is a maximum of n for a conferencing apparatus in which a transmission on an output communication path utilizes either only n signals with the greatest estimations of signal energy, or, if one of said only n signals is associated with said output signal, only (n−1) signals with the greatest estimations of signal energy other than the signal energy of an input signal associated with said output signal.

6. The apparatus as described in claim 5 wherein the number of decoders required for said decoding means is a maximum of n.

7. The apparatus as described in claim 5 further comprising means for encoding each unique output for output communication paths associated with said at least two received low bit rate voice signals.

8. The apparatus as described in claim 7 wherein the number of encoders required for said encoding means is a maximum of (n+1).

9. A method of providing a conference communication comprising the steps of:
   receiving signals at a conference bridge from a plurality of input communication paths of which at least two are associated with low bit rate voice signals;
   estimating the signal energy in each of said input communication paths to obtain a signal energy estimation;
   comparing each of said signal energy estimations against a predetermined threshold to obtain a signal energy comparison; and
   in response to said signal energy estimations and comparisons, decoding only each of said low bit rate voice signals that is required for said conference communication, wherein the number of said low bit rate voice signals required for said conference communication is a maximum of (n+1) for a conference communication in which a transmission on an output communication path utilizes only n signals with the greatest estimations of signal energy other than the signal energy of an input signal associated with said output communication path.

10. The method as described in claim 9 wherein the number of decoders required for said decoding step is a maximum of (n+1).

11. The method as described in claim 9 further comprising the step of encoding each unique output for output communication paths associated with said at least two received low bit rate voice signals.

12. The method as described in claim 11 wherein the number of encoders required for said encoding step is a maximum of (n+1).

13. A method of providing a conference communication comprising the steps of:

receiving signals at a conference bridge from a plurality of input communication paths of which at least two are associated with low bit rate voice signals;

estimating the signal energy in each of said input communication paths to obtain a signal energy estimation;

comparing each of said signal energy estimations against a predetermined threshold to obtain a signal energy comparison; and in response to said signal energy estimations and comparisons, decoding only each of said low bit rate voice signals that is required for said conference communication, wherein the number of said low bit rate voice signals required for said conference communication is a maximum of n for a conference communication in which a transmission on an output communication path utilizes either only n signals with the greatest estimations of signal energy, or, if one of said only n signals is associated with said output signal, only (n−1) signals with the greatest estimations of signal energy other than the signal energy of an input signal associated with said output signal.

14. The method as described in claim 13 wherein the number of decoders required for said decoding step is a maximum of n.

15. The method as described in claim 14 further comprising the step of encoding each unique output for output communication paths associated with said at least two received low bit rate voice signals.

16. The method as described in claim 15 wherein the number of encoders required for said encoding step is a maximum of (n+1).

* * * * *